United States Patent
Tsen et al.

(10) Patent No.: US 8,513,941 B2
(45) Date of Patent: Aug. 20, 2013

(54) POWER DETECTION REGULATION DEVICE

(75) Inventors: Ting-Chin Tsen, Taipei (TW); Shu-Chia Lin, Taipei (TW); Wen-Yueh Hsieh, Taipei (TW)

(73) Assignee: Inno-Tech Co., Ltd., Taipei (TW)

( * ) Notice: Subject to any disclaimer, the term of this patent is extended or adjusted under 35 U.S.C. 154(b) by 271 days.

(21) Appl. No.: 13/194,908

(22) Filed: Jul. 30, 2011

(65) Prior Publication Data

US 2013/0027004 A1 Jan. 31, 2013

(51) Int. Cl.
*G01R 11/63* (2006.01)

(52) U.S. Cl.
USPC ....... 324/103 R; 324/337; 324/713; 324/718; 324/416; 324/76.77; 323/304; 323/319; 323/235; 323/236; 363/43; 363/132; 363/98

(58) Field of Classification Search
USPC .................................................. 324/103 R
See application file for complete search history.

(56) References Cited

U.S. PATENT DOCUMENTS

| | | | |
|---|---|---|---|
| 5,965,998 A * | 10/1999 | Whiting et al. | 320/165 |
| 8,213,195 B2 * | 7/2012 | Tsen et al. | 363/43 |
| 8,436,574 B2 * | 5/2013 | Lai | 320/101 |
| 2009/0085586 A1 * | 4/2009 | Anderson | 324/705 |
| 2010/0176794 A1 * | 7/2010 | Tsen et al. | 324/120 |
| 2011/0194311 A1 * | 8/2011 | Gaknoki et al. | 363/21.12 |
| 2011/0234255 A1 * | 9/2011 | Chobot | 324/764.01 |

* cited by examiner

*Primary Examiner* — Arleen M Vazquez
*Assistant Examiner* — Thang Le

(57) ABSTRACT

A power detection regulation device including a power detection signal generator, a power state detector and a regulated output unit is disclosed. The power detection signal generator receives the input power from an external power supply and generates a power detection signal. The power state detector generates a power state signal based on the power state derived from the power detection signal. The regulated output unit receives the power state signal and generates a driving signal to an external electrical device in accordance with the feedback signal from the external electrical device. The power state signal is provided for the external electrical element to perform relevant processes, and the regulated output device can output the predetermined driving signal on receiving the power state signal indicating some abnormal situation in the input power so as to maintain the normal operation performed by the actuating element in the external electrical device.

11 Claims, 9 Drawing Sheets

POWER DETECTION REGULATION DEVICE

BACKGROUND OF THE INVENTION

1. Field of the Invention

The present invention relates to a power detection regulation device, and more particularly to a power detection regulation device which generates the driving signal to provide the external electrical device based on the feedback signals from the external electrical device.

2. The Prior Arts

City power is one of the most popular alternating current (AC) powers to directly supply electrical power for many home appliances and industrial production machines. Moreover, city power can be easily transformed into a direct current (DC) power to supply electrical devices which need DC power to operate, such as electrical motor or battery charger. However, the power supply quality of the city power is usually not stable enough for most appliances and machines because different levels of attenuation caused by the transmission and distribution lines and the variable load of the client sites may force the city power to frequently fluctuate and change over time. For those electrical devices normally operating with stable DC power, some precise or delicate electronic elements may suffer serious damage. Therefore, many useful power devices with regulation function have been developed, such as power regulator.

In general, power regulators may solve the fluctuation issue for city power and provide more stable power, but those current regulators may fail to supply normal power when some abnormal situations occur in city power and thus the electrical variations are out of the target regulation range, such as too small or large amplitude, too high or low frequency. Accordingly, the electrical devices may not perform normal function, or even shut down and suffer permanent damage. In addition, typical regulators are implemented in analog circuit and the performance of the regulation is relatively sensitive to environment noises such that the electrical operation is not flexible and the application is greatly limited.

In order to overcome the above mentioned drawbacks of the prior arts, there is a need for a power detection regulation device with automatically detection of abnormal situations occurring in the input power and provision of suitable stable power feeding the external electrical device, especially the power detection regulation device storing the preset amplitude and frequency in a digital manner for the target range of the normal operation.

SUMMARY OF THE INVENTION

Therefore, the present invention has been made in view of the above problem, and it is an object of the present invention to provide a power detection regulation device, comprising a power detection signal generator, a power state detector and a regulated output unit. The power detection signal generator receives the input power from an external power supply and generates a power detection signal. The power state detector generates a power state signal based on the power state derived from the power detection signal. The regulated output unit receives the power state signal and generates driving signals to an external electrical device in accordance with the feedback signals from the external electrical device. The power state signal is provided for the external electrical unit to perform relevant processes, and the regulated output device can output the predetermined driving signals on receiving the power state signal indicating some abnormal situation in the input power so as to maintain the normal operation performed by the actuating element in the external electrical device.

The input power may be a high voltage power, such as city power with 110V or 220V in sine wave. In contrast, the power detection signal, the power state signal and the feedback signal may signal at a low voltage such as 5V, which are suitably implemented and processed in an integrated circuit.

The power state signal provides external electrical devices, such as Central processing unit (CPU) or microcontroller unit (MCU), to perform relevant operation or interrupt process in case of abnormal power.

The feedback signal comprises the input current and voltage signals related to the current and terminal voltage of the external actuating element included in the external electrical device. The regulated output unit receives the input current and voltage signals and implements feedback function to stabilize the driving signal so as to avoid negative influence from loading effect imposed by the external actuating element.

Additionally, the regulated output unit may output the preset driving signal upon the power state signal indicating abnormal situation in the input power such that the external actuating element of the external electrical device maintain normal operation.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

The terms or words used in the specification and claims of the present invention are not interpreted using typical or dictionary limited meanings, and are constructed as meanings and concepts conforming to the technical spirit of the present invention based on the principle that the inventors can appropriately define the concepts of the terms to explain the present invention in the best manner. Accordingly, it is to be understood that the detailed description, which will be disclosed along with the accompanying drawings, is intended to describe the exemplary embodiments of the present invention and is not intended to represent all technical ideas of the present invention. Therefore, it should be understood that various equivalents and modifications can exist which can replace the embodiments described in the time of the application. Also, the same reference numbers used throughout the drawings refer to the same or like parts.

Figure 1:
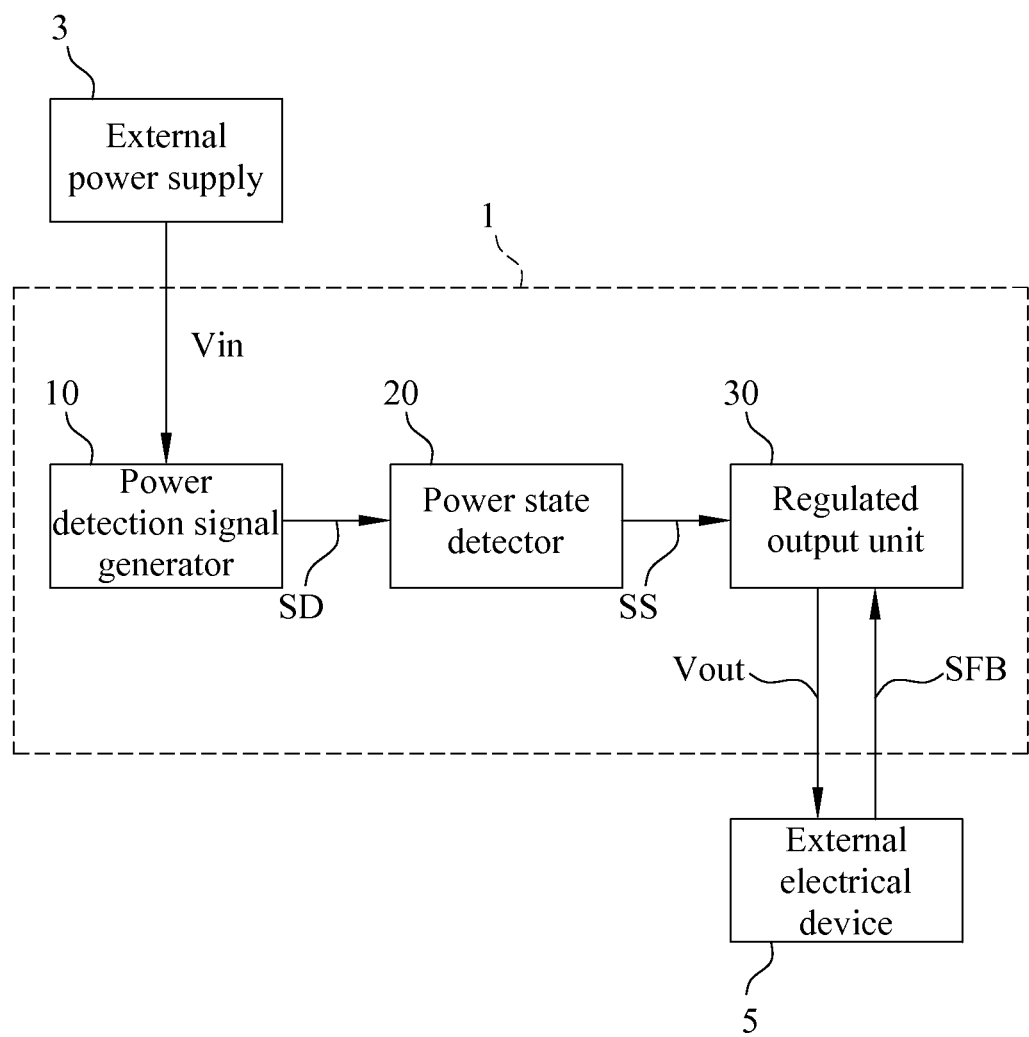
FIG. 1 illustrates the schematic view of the power detection regulation device according to the present invention.

Please refer to FIG. 1. The power detection regulation device 1 according to the present invention is used to receive the input power Vin supplied by the external power supply 3, and generates a stable driving signal Vout to supply the external electrical device 5, such as motor or battery charger. Specifically, the driving signal Vout is regulated by the power detection regulation device 1 based on the fluctuation of the input power Vin and the loading state of the external electrical device 5 so as to maintain the normal operation of the external electrical device 5 without unwanted negative effect possibly caused by the input power Vin and the loading.

It should be noted that the power detection regulation device 1 of the present invention is suitable to implement in integrated circuit to increase the operation stability of the whole system and improve the integration of the manufacturing processes.

The power detection regulation device 1 of the present invention includes a power detection signal generator 10, a power state detector 20 and a regulated output unit 30. The power detection signal generator 10 receives the input power Vin and generates a power detection signal SD. The power state detector 20 generates a power state signal SS based on the power detection signal SD by determining the state of the input power Vin. The regulated output unit 30 receives the power state signal SS and generates the driving signal Vout for the external electrical device 5 based on the feedback signal SFB from the external electrical device 5. The input power may include a high voltage power such as city power with 110V or 220V sine wave. The power detection signal SD, the power state signal SS and the feedback signal SFB may be of low voltage such as 5V or 3V, suitable for signal processing in the integrated circuit.

Figure 2:
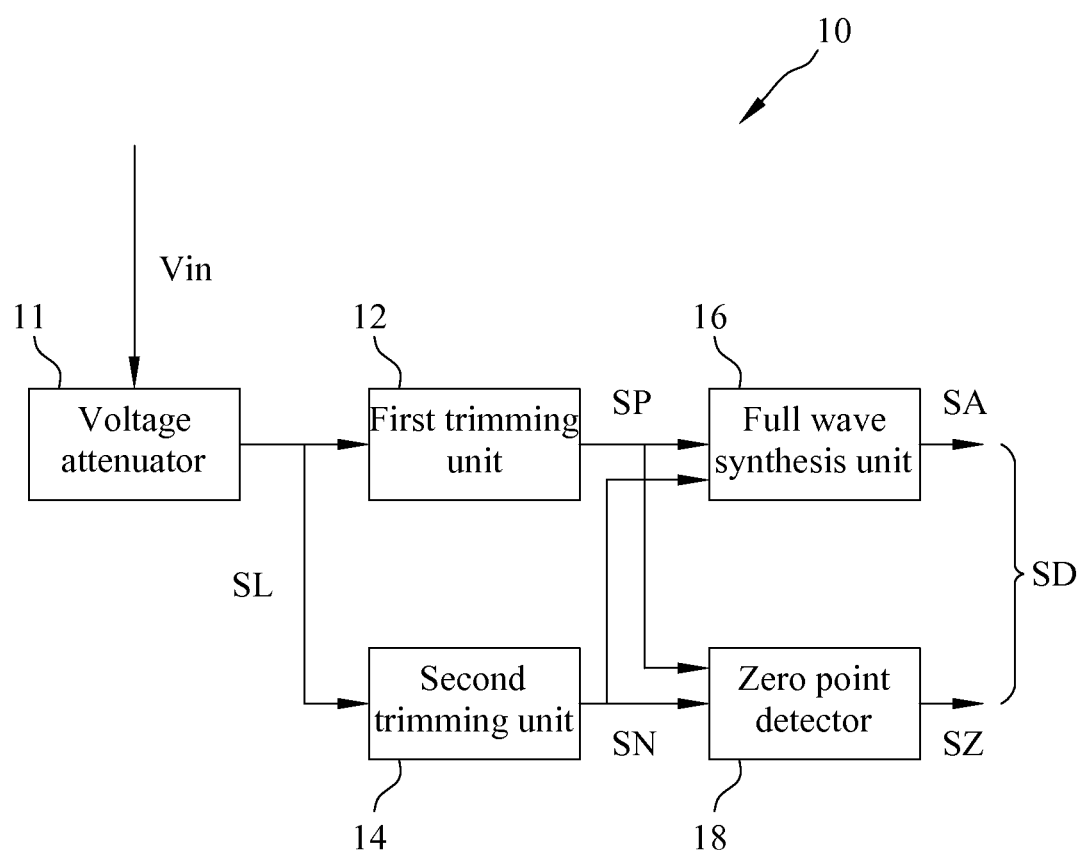
FIG. 2 illustrates the schematic view of the power detection signal generator according to the present invention.

Refer to FIG. 2. The power detection signal generator 10 comprises a voltage attenuator 11, a first trimming unit 12, a second trimming unit 14, a full wave synthesis unit 16, and a zero point detector 18 for performing attenuating, first trimming, second trimming, full wave synthesis and zero point detection, respectively.

Figure 3:
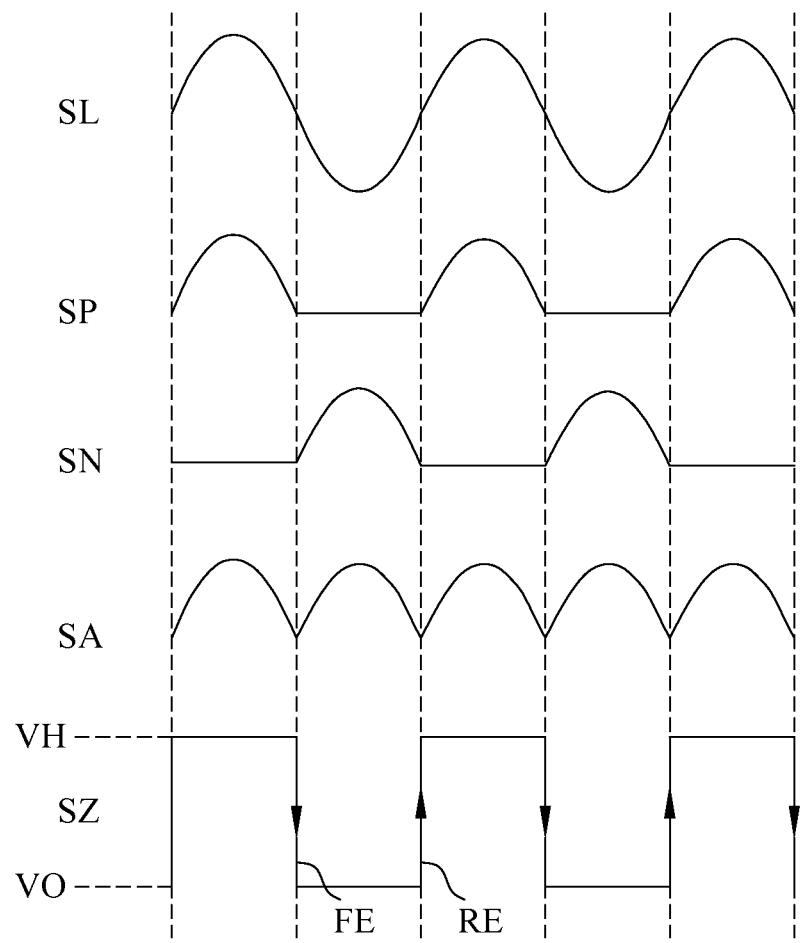
FIG. 3 illustrates the exemplary waveform of the power detection signal generator according to the present invention.

Please refer to FIG. 3. The voltage attenuator 11 is used to attenuate the input power Vin into a low voltage power signal SL, which transfers to the first trimming unit 12, the full wave synthesis unit 16 and the zero point detector 18.

The first trimming unit 12 trims off the negative voltage in one half period of the low voltage power signal SL and thus generates a positive half wave signal SP. The second trimming unit 14 trims off the positive voltage in another half period of the low voltage power signal SL, and the negative voltage signal in the one half period is reversed to positive voltage to generate a negative half wave signal SN. The full wave synthesis unit 16 receives the positive half wave signal SP and the negative half wave signal SN from the first trimming unit 12, and synthesize a full wave power signal SA containing no negative voltage.

The zero point detector 18 receives the positive half wave signal SP and the negative half wave signal SN, and generates a zero point detection signal SZ which may be a square wave. The zero point detection signal SZ is positive level VH when the positive half wave signal SP is positive, and the zero point detection signal SZ is zero level V0 when the negative half wave signal SN is positive. Thus, the rising edge RE indicates the time when the time when the voltage of the low voltage power signal SL is zero as the low voltage power signal SL rising from a negative voltage toward a positive voltage. Similarly, the falling edge FE represents the time when the voltage of the low voltage power signal SL is zero as the low voltage power signal SL falling from a positive voltage downward a negative voltage.

Alternatively, the zero point detector 18 mentioned above may generate the zero point detection signal SZ by receiving only the positive half wave signal SP and then setting the zero point detection signal SZ in a manner that the zero point detection signal SZ is positive level VH when the positive half wave signal SP is positive, and the zero point detection signal SZ is zero level V0 when the positive half wave signal SP is zero. Similarly, the zero point detector 18 may also receive only the negative half wave signal SN, and setting the zero point detection signal SZ to positive level VH when the negative half wave signal SN is zero, and setting the zero point detection signal SZ to zero level V0 when the zero point detection signal SZ is positive.

In the above-mentioned, the full wave power signal SA of the full wave synthesis unit 16 and the zero point detection signal SZ of the zero point detector combines to form the power detection signal SD in FIG. 1. That is, the power detection signal SD includes the full wave power signal SA and the zero point detection signal SZ.

Figure 4:
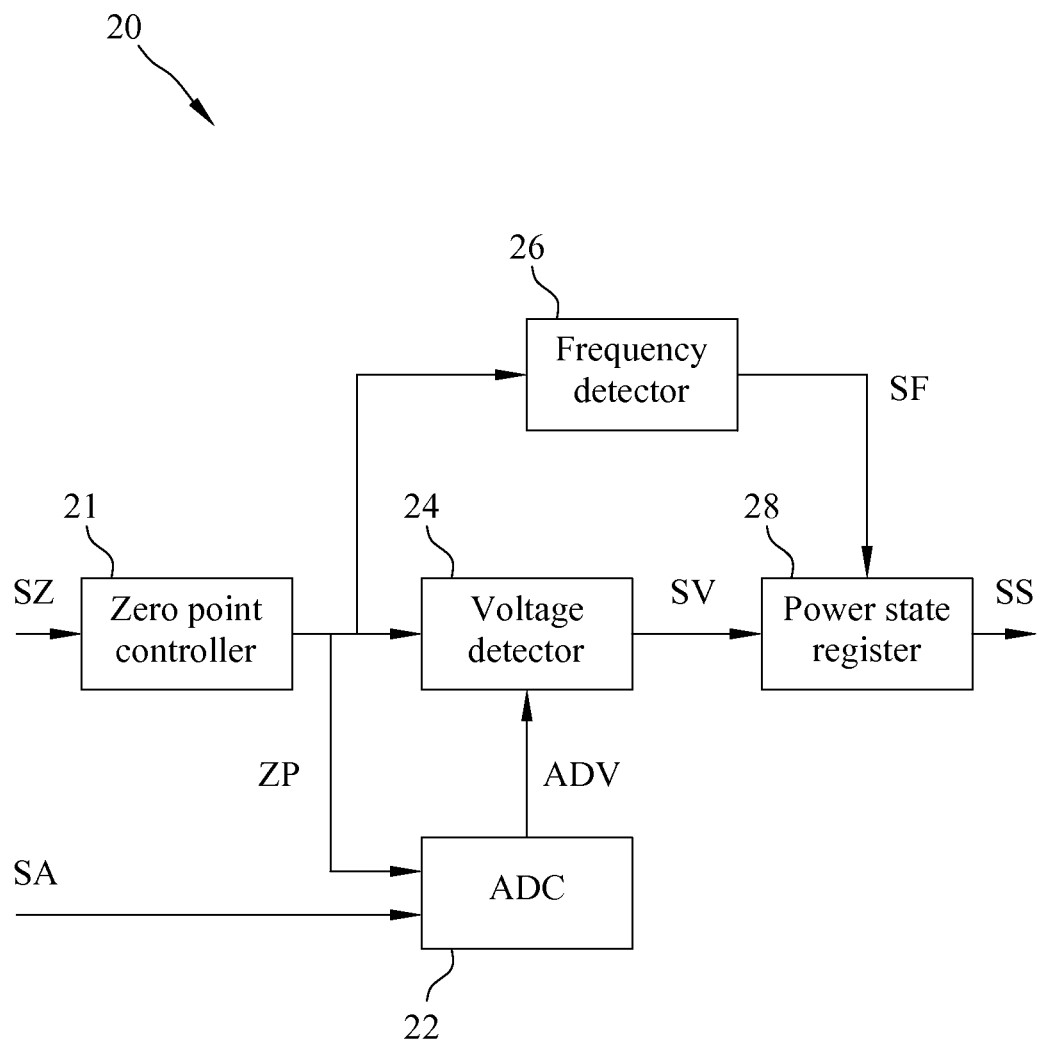
FIG. 4 illustrates the schematic view of the power state detector according to the present invention.

Please refer to FIG. 4. As shown in FIG. 4, the power state detector 20 comprising a zero point controller 21, an analog-to-digital converter 22, a voltage detector 24, a frequency detector 26 and a power state register 28 is utilized to receive the power detection signal SD containing the full wave power signal SA and the zero point detection signal SZ, determining whether the power state is abnormal, and generating the power state signal SS when the power state is abnormal and then delivering the power state signal SS to the external electrical device for performing related processes. For example, the external CPU or MCU is used to receive the power state signal SS and execute interrupt management for the abnormal power so as to protect the ongoing program and the temporary data to be treated or saved.

Figure 5:
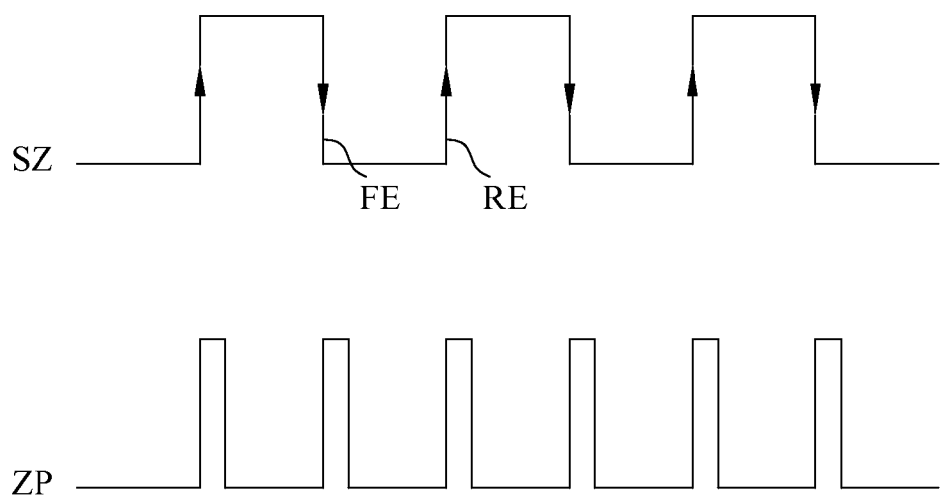
FIG. 5 illustrates the exemplary waveform of the zero point control signal according to the present invention.

The zero point controller 21 receives the zero point detection signal SZ and generates the zero point control signal ZP based on the rising edge RE and falling edge FE of the zero point detection signal SZ. The zero point control signal ZP may be a signal consisting of impulses. That is, the zero point control signal ZP is a pulse wave with a plurality of impulses, wherein each impulse has a relative short width and two adjacent impulses are spaced by a pitch specified by the adjacent rising edge RE and falling edge FE, as shown in FIG. 5. It should be noted that FIG. 5 only illustrates an exemplary waveform of the zero point control signal ZP, which is recognized not to limit the scope of the present invention. Therefore, instead of one single impulse, two or more impulses can be used to response to each rising edge RE and falling edge FE.

The analog-to-digital converter (ADC) 22 receives the full wave power signal SA in analog form and the zero point control signal ZP generated by the zero point controller 21, and performs the analog-to-digital conversion on the full wave power signal SA by repeating the preset sampling number, such as 64, so as to generate a voltage sampling signal ADV in digital form. That is, the voltage sampling signal ADV between two adjacent pulses has 64 values in total. It should be noted that any positive integer can be assigned for the sampling number.

Figure 6:
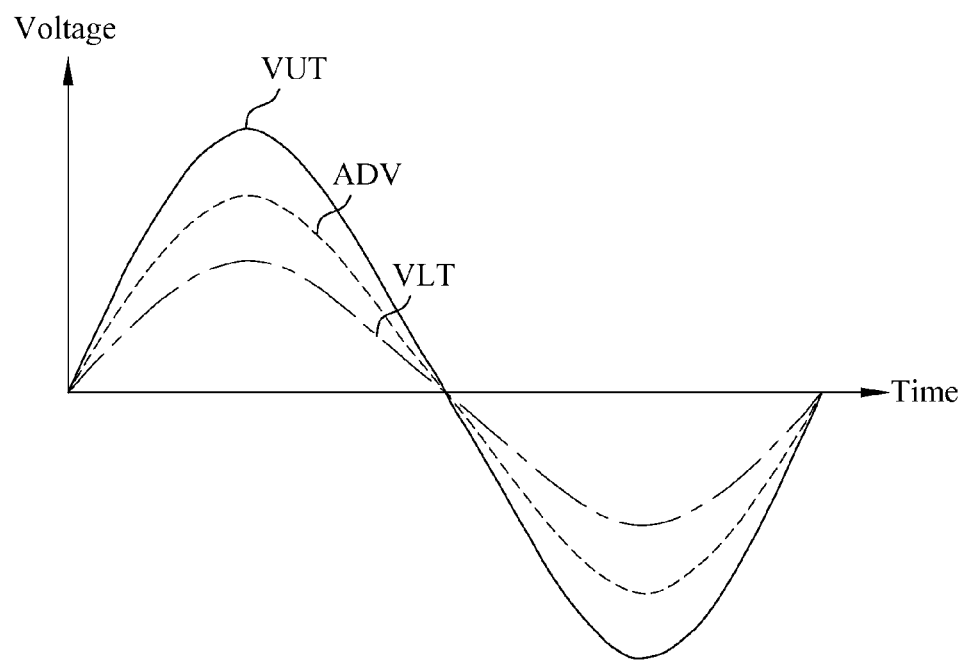
FIG. 6 illustrates the exemplary waveform of the voltage sampling signal according to the present invention.

The voltage detector 24 receives the zero point control signal ZP and the voltage sampling signal ADV, and performs comparison operation on the voltage sampling signal ADV between two adjacent impulses of the zero point control signal ZP. The comparison operation includes a predetermined number of times, such as 64 times, of sampling comparison to simultaneously compare the sampling voltage signal ADV and the upper threshold voltage VUT and the lower threshold voltage VLT, as shown in FIG. 6. The higher voltage count increases when the sampling voltage signal ADV is greater than the upper threshold voltage VUT, and the lower voltage count increases when the sampling voltage signal ADV is less than the lower threshold voltage VLT. Finally, at the next pulse of the zero point control signal ZP, it is determined whether the higher voltage count is not less than the higher voltage count threshold and whether the lower voltage count is not less than the lower voltage count threshold. The voltage abnormal inform signal SV indicating abnormal situation occurring in the input power Vin is generated if the higher voltage count is not less than the higher voltage count threshold or the lower voltage count is not less than the lower voltage count threshold.

The frequency detector 26 receives the zero point control signal ZP and uses a frequency counter (not shown) to count the number of impulses in a predetermined period of time such as 0.1 second and generate a frequency count. Then the frequency detector 26 further determines whether the frequency count is within a preset frequency range, such as 50±2 HZ or 60±2 HZ. A frequency abnormal inform signal SF is generated to indicate a frequency abnormal for the input power Vin if the frequency count is out of the preset frequency range.

The power state register 28 receives the voltage abnormal inform signal SV and the frequency abnormal inform signal SF, and generates the power state signal SS indicating the input power Vin is abnormal based on at lease one of the voltage abnormal inform signal SV and the frequency abnormal inform signal SF.

Figure 7:
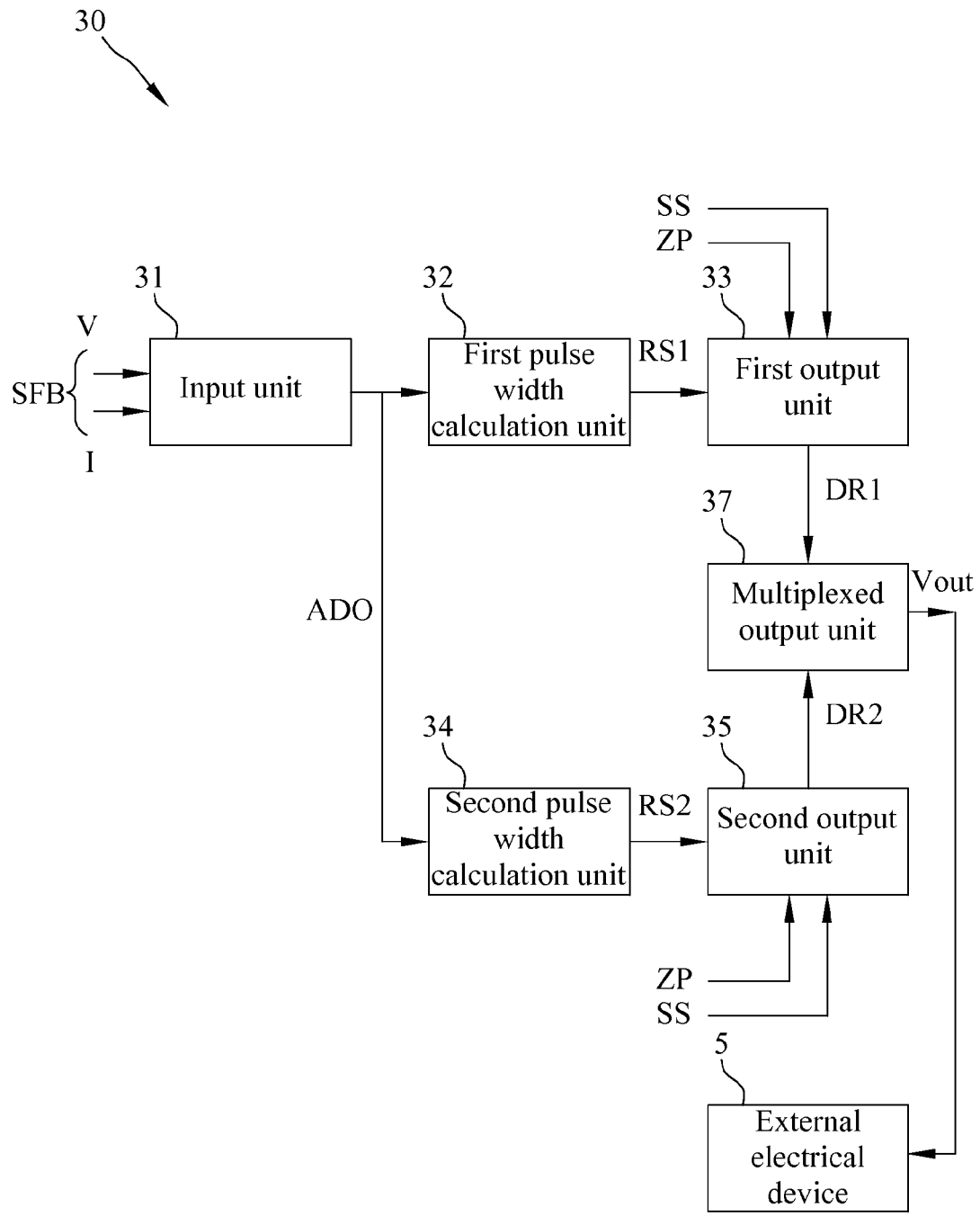
FIG. 7 illustrates the schematic view of the regulated output unit according to the present invention.

Refer to FIG. 7. The regulated output unit 30 comprises an input unit 31, a first pulse width calculation unit 32, a first output unit 33, a second pulse width calculation unit 34, a second output unit 35, a multiplexed output unit 37 and a register unit (not shown) to generate a driving signal DR supplying for the external electrical device 5.

The register unit is used to store and output some preset parameters to the first pulse width calculation unit 32, first output unit 33, second pulse width calculation unit 34, second output unit 35 and multiplexed output unit 37, wherein said preset parameters includes the first failure time, second failure time, first half period time, second half period time, root-mean-square voltage of the input power, preset frequency and output mode.

The input unit 31 receives the feedback signal SFB to generate the output signal ADO containing information related to the feedback signal SFB which comprises the current I and voltage V of the external actuating element built in the external electrical device 5.

The first pulse width calculation unit 32 receives the output signal ADO and the first failure time Dt1 from the register unit to generate the first reference signal RS1 containing the first pulse width W1 and the first low level time Lt1. The first pulse width W1 is expressed as $W1=Th*(Vrms/Vp)^2$, where Th is the first period time, Vrms is the root-mean-square of the input voltage signal, and Vp is the peak voltage of the input voltage signal. The first low level time Lt1 is expressed as $Lt1=(Th-W1-2*Dt1)/2$, where Dt1 is the first failure time.

Figure 8:
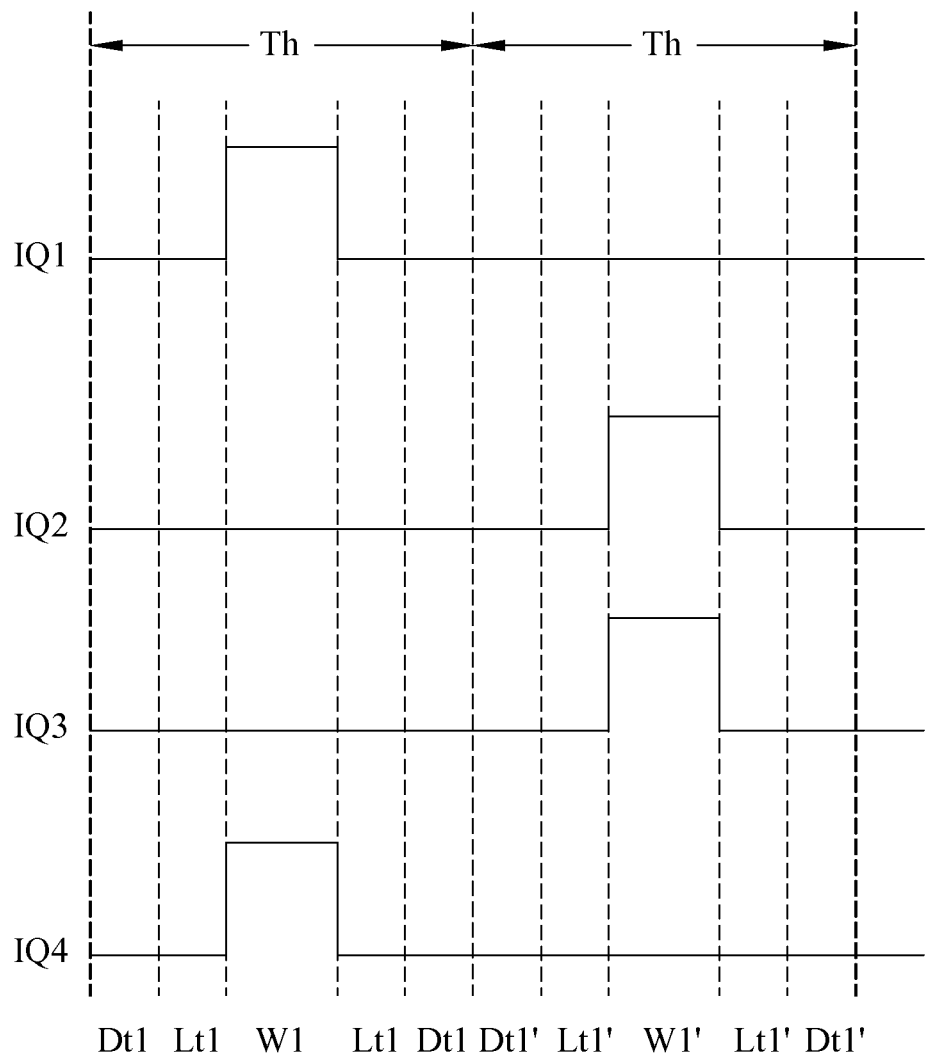
FIG. 8 illustrates the exemplary waveform of the first output signal according to the present invention.

The first output unit 33 receives the first reference signal RS1 to generate the first output signal DR1 in form of pulse width modulation (PWM). The first output signal DR1 contains the first step driving signal IQ1, second step driving signal IQ2, third step driving signal IQ3 and fourth step driving signal IQ4, as shown in FIG. 8. The first pulse width W1' and first low level time Lt1' in the second half period next to the first half period is defined as the same way as the above-mentioned, and the first failure time Dt1 is set by the register unit.

The second pulse width calculation unit 34 receives the output signal ADO and the second failure time Dt2 from the register unit to generate the second reference signal RS2 containing the second pulse width W2 and the second low level time Lt2. The second pulse width W2 is expressed as $W2=W2max*Sin\ \theta$, where W2max is the maximum of the second pulse width W2 and $\theta$ is the phase angle. W2max is expressed as $Ths*(Vrms/Vp)^2$, where Ths is the second period time, Vrms is the root-mean-square of the input voltage signal, and Vp is the peak voltage of the input voltage signal. The second low level time Lt2 is expressed as $Lt2=(Ths-W2-2*Dt2)/2$, where Dt2 is said second failure time.

Figure 9:
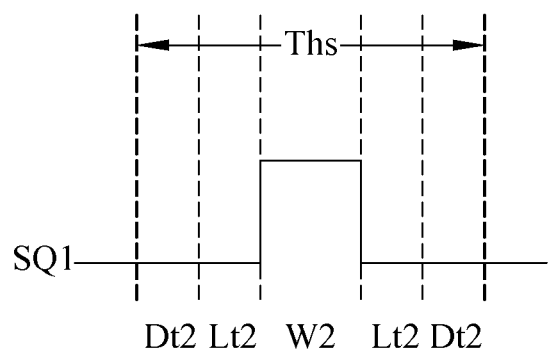
FIG. 9 illustrates the exemplary waveform of the second output signal according to the present invention.

The second output unit 35 receives the second reference signal RS2 to generate the second output signal DR2 in form of pulse width modulation. The second output signal DR2 contains the first sine driving signal SQ1, second sine driving signal SQ2, third sine driving signal SQ3 and fourth sine driving signal SQ4, as shown FIG. 9. For clear explanation, FIG. 9 illustrates the waveform of the first sine driving signal SQ1 only.

Furthermore, the first output unit 33 and the second output unit 35 receive the power state signal SS indicating that the input power is abnormal, and actively generate the first output signal DR1 and the second output signal DR2 preset, respectively, such as city power with a frequency of 50 Hz or 60 Hz. Additionally, the power state signal SS may be provided for the external electrical element to perform further related operations, such as CPU or MCU.

The multiplexed output unit 37 receives the first output signal DR1 and the second output signal DR2 to generate the driving signal DR, comprising the first driving signal Q1, second driving signal Q2, third driving signal Q3 and fourth driving signal Q4, based on the output mode which is set by the register unit. The output mode includes the step wave operation mode and the sine wave operation mode. In the step wave operation mode, the driving signal DR is assigned as the first output signal DR1, and in the sine wave operation mode, the driving signal DR is assigned as the second output signal DR2.

The above register unit can be replaced by a microcontroller to implement the same function.

The aspect of the power detection regulation device in accordance with the present invention is that the power detection signal generator, the power state detector and the regulated output unit can be easily implemented by the integrated circuit or further integrated into the microcontroller such that the operation of the power detection regulation device is controlled by the firmware executed by the microcontroller. Thus, the flexibility of operation can be improved and it is possible to increase or incorporate different electrical functions. For example, the settings of the parameters desired for different unit can be changed by updating or re-restoring the firmware.

Another aspect of the present invention is that the power state signal indicating abnormal situation occurring in the input power can be provided for the external electrical element such as CPU or MCU, to perform related operations. For example, the CPU receives the power state signal to perform abnormal power interrupt management, such as immediately store the temporary ongoing data, shut off the power or start the spare battery power in order to protect the operations related to the ongoing program and store the ongoing or processing data to the store medium for safety.

A further aspect of the present invention is that it is possible to provide the PWM step wave or PWM sine wave as the driving signal desired for the external electrical device with the full bridge, half bridge or push-pull architecture. Moreover, the present invention can output the predetermined driving signal even when the input power is abnormal so as to maintain the normal operation of the external electrical device to avoid damage.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A power detection regulation device, for receiving an input power from an external power supply to generate a power state signal and a driving signal provided for an external electrical element and an external electrical device, respectively, said power detection regulation device comprising:
   a power detection signal generator, receiving said input power and sequentially performing processes comprising voltage attenuation, first trimming, second trimming, full wave synthesis and zero point detection to generate a power detection signal which comprises a full wave power signal and a zero point detection signal;
   a power state detector, generating a power state signal based on a power state derived from said power detection signal; and
   a regulated output unit, receiving said power state signal and a feedback signal from said external electrical device and generating said driving signal based on said feedback signal.

2. The power detection regulation device as claimed in claim 1, wherein said input power is a high voltage power as city power with 110V or 220V sine wave, and said power detection signal, said power state signal and said feedback signal are of 5V low voltage.

3. The power detection regulation device as claimed in claim 1, wherein said power detection signal generator comprises:
   a voltage attenuator, attenuating said input power into a low voltage power signal;
   a first trimming unit, trimming negative voltage in a half period of said low voltage power signal and generating a positive half wave signal;
   a second trimming unit, trimming positive voltage in an another half period of said low voltage power signal and reversing negative voltage in said another half period of said low voltage power signal into positive voltage to generate a negative half wave signal;
   a full wave synthesis unit, receiving said positive half wave signal and said negative half wave signal to synthesize said full wave power signal with positive voltage; and
   a zero point detector, receiving at least one of said positive half wave signal and said negative half wave signal to generate said zero point detection signal.

4. The power detection regulation device as claimed in claim 3, wherein said zero point detector receives only said positive half wave signal such that said zero point detection signal is set to a positive level when said positive half wave signal is of positive voltage, and said zero point detection signal is set to a zero level when said positive half wave signal is of zero voltage.

5. The power detection regulation device as claimed in claim 3, wherein said zero point detector receives only said negative half wave signal, said zero point detection signal is set to a positive level when said negative half wave signal is of zero voltage, and said zero point detection signal is set to a zero level when said negative half wave signal is of positive voltage.

6. The power detection regulation device as claimed in claim 3, wherein said zero point detector receives said positive half wave signal and said negative half wave signal to generate said zero point detection signal, and wherein said zero point detection signal is set to a positive level when said positive half wave signal is of positive voltage, and said zero point detection signal is set to a zero level when said negative half wave signal is of positive voltage.

7. The power detection regulation device as claimed in claim 1, wherein said power state detector comprises:
   a zero point controller, receiving said zero point detection signal and generating a zero point control signal based on a rising and falling edge of said zero point detection signal, wherein said zero point control signal is a pulse wave with a plurality of impulses, and wherein each impulse has a relative short width and two adjacent impulses are spaced by a pitch specified by the adjacent rising edge RE and falling edge;
   an analog-to-digital converter, receiving said full wave power signal and said zero point control signal and performing an analog-to-digital conversions on said full wave power signal between two adjacent pulses by repeating a preset number of times to generate a voltage sampling signal in digital form;
   a voltage detector, receiving said zero point control signal and said voltage sampling signal, and performing comparison operation on said voltage sampling signal between two adjacent impulses of said zero point control signal, said comparison operation comprising said preset number of times of sequential sampling comparison to simultaneously compare said sampling voltage signal and a upper threshold voltage and a lower threshold voltage, a higher voltage count increasing when said sampling voltage signal is greater than said upper threshold voltage, a lower voltage count increasing when said sampling voltage signal is less than a lower threshold voltage, and at a next pulse of said zero point control signal, generating a voltage abnormal inform signal if said higher voltage count is not less than a higher voltage count threshold or said lower voltage count is not less than a lower voltage count threshold;
   a frequency detector, receiving said zero point control signal and generating a frequency count by use of a frequency counter to count impulses of said zero point control signal, determining whether said frequency count is within a preset frequency range, and generating a frequency abnormal inform signal to indicate a frequency abnormal for said input power if said frequency count is not within said preset frequency range; and
   a power state register, receiving said voltage abnormal inform signal and said frequency abnormal inform signal to generate said power state signal based on at least one of said voltage abnormal inform signal and said frequency abnormal inform signal to indicate said input power is abnormal.

8. The power detection regulation device as claimed in claim 1, wherein said regulated output unit comprises:
   a register unit, storing and outputting preset parameters, comprising a first failure time, a second failure time, a first half period time, a second half period time, a root-mean-square voltage of said input power, a preset frequency and an output mode;

an input unit, receiving said feedback signal to generate an output signal containing information related to a current and voltage of an external actuating element built in said external electrical device;

a first pulse width calculation unit, receiving said output signal and said first failure time from said register unit to generate a first reference signal containing a first pulse width and a first low level time;

a first output unit, receiving said first reference signal to generate a first output signal in form of pulse width modulation, said first output signal containing a first step driving signal, a second step driving signal, a third step driving signal and a fourth step driving signal;

a second pulse width calculation unit, receiving said output signal and said second failure time from said register unit to generate a second reference signal containing a second pulse width and a second low level time;

a second output unit, receiving said second reference signal to generate a second output signal in form of pulse width modulation, said second output signal containing a first sine driving signal, a second sine driving signal, a third sine driving signal and a fourth sine driving signal; and a multiplexed output unit, receiving said first output signal and said second output signal to generate said driving signal based on an output mode, said driving signal comprising a first driving signal, a second driving signal, a third driving signal and a fourth driving signal, said output mode comprising a step wave operation mode and a sine wave operation mode, said driving signal delivering said first output signal in said step wave operation mode, and said driving signal delivering said second output signal in said sine wave operation mode.

9. The power detection regulation device as claimed in claim 8, wherein said first pulse width is expressed as $W1=Th*(Vrms/Vp)^2$, where $W1$ is said first pulse width, Th is said first period time, Vrms is a root-mean-square of said input voltage signal, and Vp is a peak voltage of said input voltage signal, and said first low level time is expressed as $Lt1=(Th-W1-2*Dt1)/2$, where $Lt1$ is said first low level time, and $Dt1$ is said first failure time.

10. The power detection regulation device as claimed in claim 8, wherein said second pulse width is expressed as $W2=W2max*Sin\,\theta$, where $W2$ is said second pulse width, W2max is a maximum of said second pulse width, and $\theta$ is a phase angle, and W2max is expressed as $Ths*(Vrms/Vp)^2$, Ths is said second period time, Vrms is a root-mean-square of said input voltage signal, and Vp is a peak voltage of said input voltage signal, and said second low level time is expressed as $Lt2=(Ths-W2-2*Dt2)/2$, where $Lt2$ is said second low level time, and $Dt2$ is said second failure time.

11. The power detection regulation device as claimed in claim 8, wherein said first output unit and said second output unit receive said power state signal indicating said input power is abnormal, and based on said preset frequency stored in said register unit, actively generate said first output signal and said second output signal predetermined, respectively, and said preset frequency is of 50 Hz or 60 Hz.

* * * * *